United States Patent Office

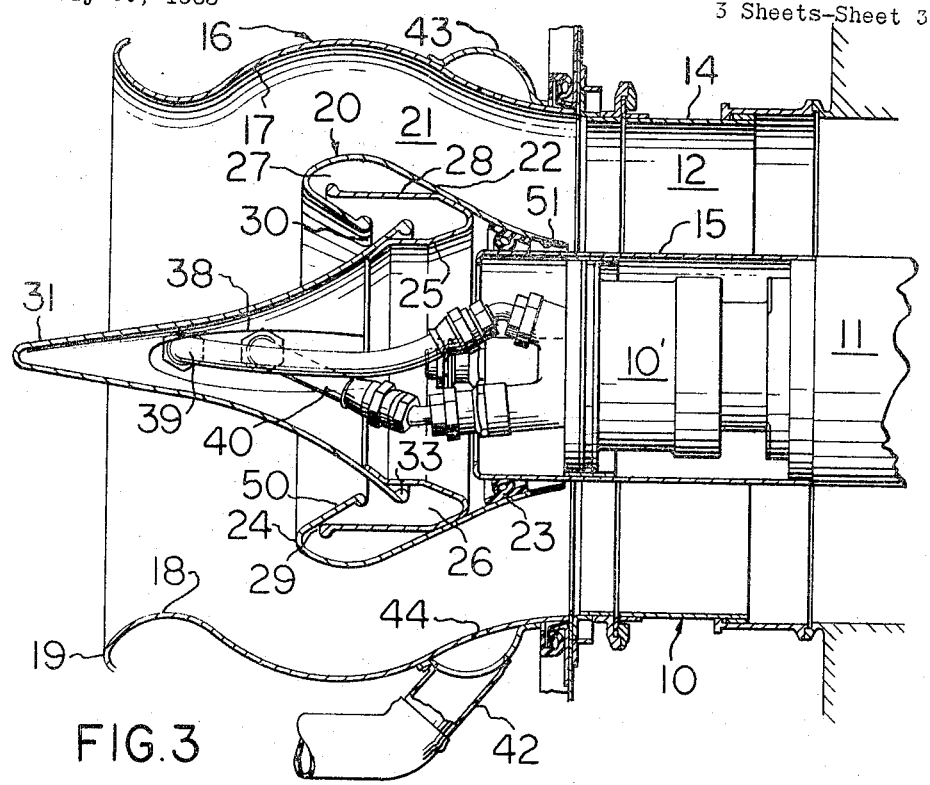
FIG.3
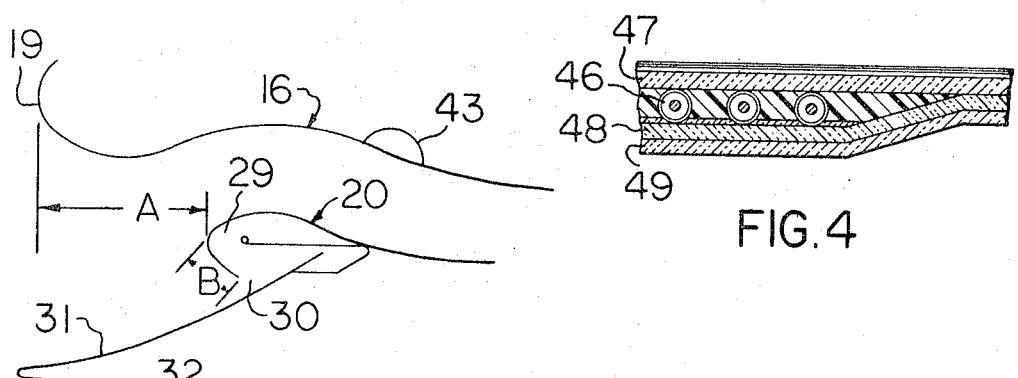
FIG.4
FIG.5
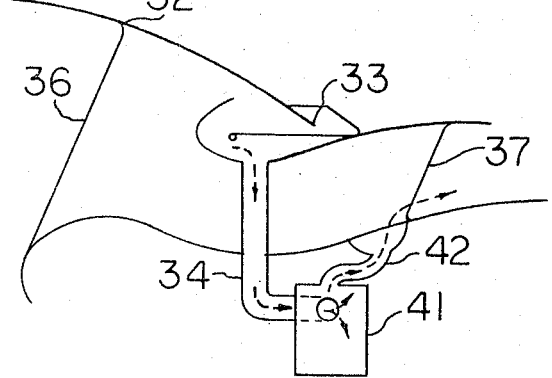
INVENTORS
ROBERT P. HOOPER
&ANDREW A. PETERSON
BY
THEIR ATTORNEY

3,368,332
Patented Feb. 13, 1968

3,368,332
FOREIGN PARTICLE SEPARATOR FOR AN AIR MOVING MEMBER
Robert P. Hooper and Andrew A. Peterson, Media, Pa., assignors to The Boeing Company, Seattle, Wash., a corporation of Delaware
Filed July 30, 1963, Ser. No. 298,635
2 Claims. (Cl. 55—306)

This invention relates to a particle separator for an air stream and, more particularly, to a foreign particle separator for use with the air intake of an air moving member such as a gaseous power plant.

The ingestion of foreign particles and moisture into any air moving member such as power plants, ducted fans, ground effect machines and the like creates problems in the operation of the air moving member by reducing the efficiency and/or damaging parts. One example of this is a gas turbine engine wherein foreign particles, such as dirt, sand, water, and the like, materially shorten the life of various elements of the engine such as the blades of the compressor, for example. These foreign particles can cause substantial damage such as pitting, corrosion, fouling of various engine parts, and other serious problems.

The problem in ingested foreign particles and moisture is universal to all types of gas turbine engine usage; however, the problem is particularly troublesome in helicopter applications. The unique hovering characteristics and ability to land and take-off from most any type of terrain or body of water makes the gas turbine powered helicopter particularly susceptible to the problems created by foreign particles.

Thus, if a helicopter were to hover, land, or take-off from a body of salt water, the ingestion of salt water is the result with salt being deposited on the compressor blades causing performance losses. Similarly, if the helicopter is operated from land bases, such as beaches, fields, mountainous terrain, or the like, the engine intake will be contaminated by an ingestion of dirt, small particles of stone, sand, or similar material with the consequent result of serious pitting, fouling, or in some instances the initiation of fractures to delicate precision elements of the engine.

Various structures have been employed for preventing foreign particles from entering a power plant such as a gas turbine engine. However, in order to remove particles of the small size of sand and water, the previously employed structures have caused an engine power loss in the range of 5% or more. This is usually caused by the angular changes in direction of the air flow prior to its entering the inlet of the engine.

Accordingly, the separator must provide maximum separation with a minimum of pressure loss. Failure to minimize pressure losses can be critical, for instance, in aircraft engines since loss of pressure entering the engine is equated directly to energy levels in the engine that are directly proportional to the horsepower output of the engine. For example, a loss of one horsepower in the horsepower output of a helicopter engine reduces the load capacity of the helicopter by 10 lbs. Thus, if there is a 5% engine horsepower loss, which is very common due to pressure loss, the load capability for a helicopter, which has an engine with a rated 3,000 horsepower output, is reduced by 1500 lbs. Therefore, fine screens or elaborate labyrinths cannot be utilized to provide a satisfactory solution.

The present invention satisfactorily solves the problem of removing particles of small size without significant power or pressure loss in the power plant. The separator of the present invention obtains these desired results by using the inlet of the separator as a focusing means to focus the particles as they enter the separator into the collection area. Because of careful design of the focusing inlet, the air stream remains uniform and unbroken and the particles, carried by the air stream, are not required to pass through the air stream on multiple occasions to reach the collection area. The result of this arrangement is immediate and effective separation upon air entry with virtually no pressure losses. Tests with the foreign particle separator of the present invention have resulted in over half of all non-liquid particles of a size greater than ten microns being separated from the air flowing to the power plant with a power loss of approximately .6% and a pressure loss of about .3%.

An object of this invention is to provide a foreign particle separator for the inlet of a power plant such as a gas turbine engine or the like.

Another object of this invention is to provide a foreign particle separator that is capable of removing a significant portion of all particles particularly those greater than ten microns in size without significant power and pressure losses.

A further object of this invention is to provide a foreign particle separator that is capable of removing a substantial part of the moisture content in the air.

Still another object of this invention is to provide a foreign particle separator that is capable of removing all sizes of particles and moisture from the incoming air.

Yet another object of this invention is to provide a foreign particle separator that creates a minimum of pressure loss across the separator and a corresponding resulting minimum power loss.

A still further object of this invention is to provide a foreign particle separator that focuses the particles into a collection area by means of the inlet configuration.

Another object of this invention is to provide a foreign particle separator that maintains a positive suction pressure in the collection area to provide for ready removal of the particles directed into the collection area.

Other objects of this invention will be readily perceived from the following description, claims, and drawings.

This invention relates to an air inlet adapted to be connected to an air intake passage of an air moving member. The air intake passage has spaced inner and outer walls. The inlet has an outer wall with a periphery at least as great as the periphery of the outer wall of the air intake passage. The inlet includes an inner member surrounded by the outer wall and spaced therefrom to form an air duct therebetween for communication with the air intake passage. The inner member has a portion forming a continuation of the inner wall of the air intake passage. The cross sectional area of the air duct between the outer wall of the inlet and the portion of the inner member is at least equal to the cross sectional area of the air intake passage. The inner member has a streamlined member extending forward therefrom. The inner member has a particle collector positioned inwardly of the air duct forming portion. The collector has an opening adjacent the rearward end of the streamlined member for removing foreign particles from the air flowing through the air duct. The particles are removed from the collector by suitable means.

The attached drawings illustrate a preferred embodiment of the invention, in which FIGURE 1 is a front end view of the air inlet of the present invention;

FIGURE 3 is a sectional view of the air inlet and taken along line 3—3 of FIGURE 1;

FIGURE 4 is a sectional view of the heating element of the present invention;

FIGURE 5 is a schematic view of the air inlet; and

FIGURE 6 is a sectional view taken along line 6—6 of FIGURE 1.

Figure 2:
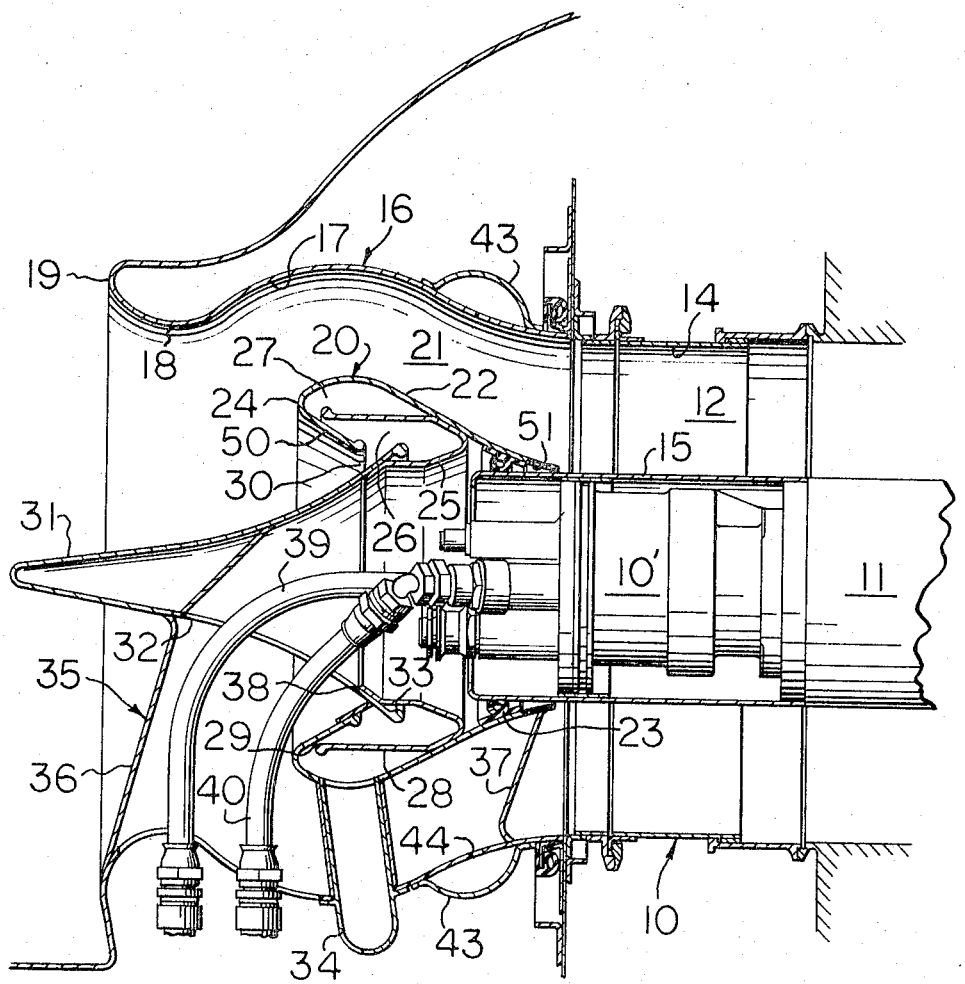
FIGURE 2 is a sectional view of the air inlet and taken along the line 2—2 of FIGURE 1.

Referring to the drawings and particularly FIGURE 2, there is shown a power plant 10 such as a gas turbine engine or the like. The power plant 10 includes a compressor 11 having an annular air intake passage 12, which is formed by an outer wall 14 and an inner wall 15. It should be noted that the air intake passage 12 extends forward of the compressor 11 so that the inner wall 15 functions as a housing for a starter motor 10'.

The annular air intake passage 12 has an air inlet 16 connected thereto. The air inlet 16 includes an outer wall 17, which forms a continuation of the outer wall 14 of the annular air intake passage 12 of the compressor 11.

The outer wall 17, which is preferably of circular shape, has a periphery at least equal to the periphery of the outer wall 14 of the air intake passage 12. As shown in FIGURE 2, the diameter of the outer wall 17 increases in a forward direction from the air intake passage 12 for a substantial distance. However, the periphery of the outer wall 17 again reduces until it reaches a minimum at the point 18. Thereafter, the periphery of the outer wall 17 again increases until it reaches forwardmost point 19 of the inlet 16.

The outer wall 17 is formed along a substantially constant radius of curvature from the point 18 to the point 19. This radius may be easily determined for each minimum diameter of the inlet as will be explained hereinafter. If the radius is too small in proportion to the minimum diameter of the inlet, air stream separation will result whereby turbulence, which causes pressure losses, is created. If the radius is too large, it will reduce the effectiveness of the focusing, which decreases the efficiency of separation.

The outer wall 17 of the inlet 16 surrounds an inner member 20, which also is referred to as the collection area, and is spaced therefrom to form an annular air duct 21 therebetween for communication with the air intake passage 12. The inner member 20 includes a fairing member 22, which forms a continuation of the inner wall 15 of the air intake passage 12.

The fairing member 22 is spaced a small distance from the inner wall 15, as shown in FIGURE 2, and a gasket 23 is disposed between the inner surface of the fairing member 22 and the inner wall 15 to seal the space therebetween. The terminal end of the fairing member 22 has a stainless steel ring 51 bonded on the inner surface thereof. A recess is provided in the fairing member 22 for the ring 51 so that the ring 51 forms a smooth continuation with the remainder of the inner surface of the member 22. The ring 51 protects the fairing member 22, which is preferably made of glass impregnated material, if the fairing member 22 should be misaligned during installation about the starter motor 10'.

The periphery of the fairing member 22, which is preferably circular in shape, increases toward the forward portion of the inlet 16. The fairing member 22 is substantially parallel to the outer wall 17 in forming the portion of the annular duct 21 therebetween. The fairing member 22 reaches its maximum periphery along approximately the same diameter as the maximum periphery of the outer wall 17.

It is important to note that the inner member 20 is given a streamlined configuration in the area of the fairing member 22 to insure that there is no air separation as the air passes over the member 20. No specific aerodynamic configuration is required as it is only necessary that turbulence be avoided.

After reaching its maximum, the periphery of the fairing member 22 decreases until forwardmost point or end 24 is reached. The fairing member 22 has a portion 50 extending rearwardly from the forwardmost point 24 towards the centerline of the power plant 10 until it terminates leaving sufficient clearance between the portion 50 and a streamlined member 31 to allow particles to enter the collection area at opening 30.

The angular portion 50 of the fairing member 22 is disposed at an angle of substantially 30° to the centerline of the power plant 10. The 30° angle of the portion 50 to the centerline of the power plant 10 has been determined to be the most satisfactory angle for removing particles of water in the air flowing through the inlet 16.

The inner member 20 has a second member 25, which is bonded to the fairing member 22. The second member 25 cooperates with the fairing member 22 to form a foreign particle collector therebetween. The collector is divided into annular chambers 26 and 27 by a partition portion 28 of the second member 25. The partition portion 28 of the member 25 is spaced from the angular portion 50 of the fairing member 22 to form a gap 29 therebetween to provide communication between the chamber 26 and the chamber 27 of the foreign particle collector.

The second member 25 is spaced from the terminal end of the angular portion 50 of the fairing member 22 to provide the opening 30 into the annular chamber 26 of the foreign particle collector. The streamlined member 31, which is part of the inner member 20, is bonded to the second member 25 adjacent the opening 30. The member 31 provides a frontal cover member for the starter 10' of the power plant 10.

The streamlined member 31 increases in cross sectional area in the direction of air flow through the inlet 16. A portion of the streamlined member 31 from point 32 to terminal point 33 is formed on a radius of curvature, which is less than the radius of the outer wall 17 at the point 18. The remainder of the streamlined member 31 is of conical shape. Although the streamlined member 31 is not necessary to achieve effective separation, when used it should be designed to achieve a low angle of reflection after contact. An impact absorbent material such as a layer of rubber or the like also might be used to coat the cone in order to reduce the rebound after impact. This reduces the number of particles that escape back into the main air-stream after striking the streamlined member. It should be noted that if the shape of the streamlined member 31 were completely conical, more of the particles would rebound from the member 31 into the air flowing through the inlet 16 to the air intake passage 12 rather than being collected in the opening 30.

The flow of particles is around the lip of the inlet, as defined by reference points 18, 19, and into the collection area or directly into the collection area from in front of the engine. It has been found that most of the air enters from around the lip edges. In each case, the collector operation comes about due to the inertia of the particles, which tend to continue in the direction of travel while the air stream bends around the lip of the collector area, defined by the member 20, and into the compressor 11.

The lip of the inlet plays an important role in directing particles coming into the engine air inlet at angles to the centerline of the engine. It is important that this air be directed toward the centerline of the engine in order to give direction to the particles before the air enters the air duct 21. The configuration of the lip of the inlet provides this direction, and, consequently, the radius of the lip between points 18 and 19 must be proportionate to the minimum radius of the inlet. The actual ratio may be determined experimentally for given minimum diameters.

It also is necessary that the distance between the inlet lip and the collection opening be determined experimentally in order to insure that the particles do not overshoot the collection opening or, where the streamlined member 31 is used, bounce back into the air stream. This distance also can be experimentally determined and set forth as a ratio of minimum diameter and distance. Each of the foregoing dimensions may be readily determined by relatively simple testing using the teachings set forth herein.

Figure 1:
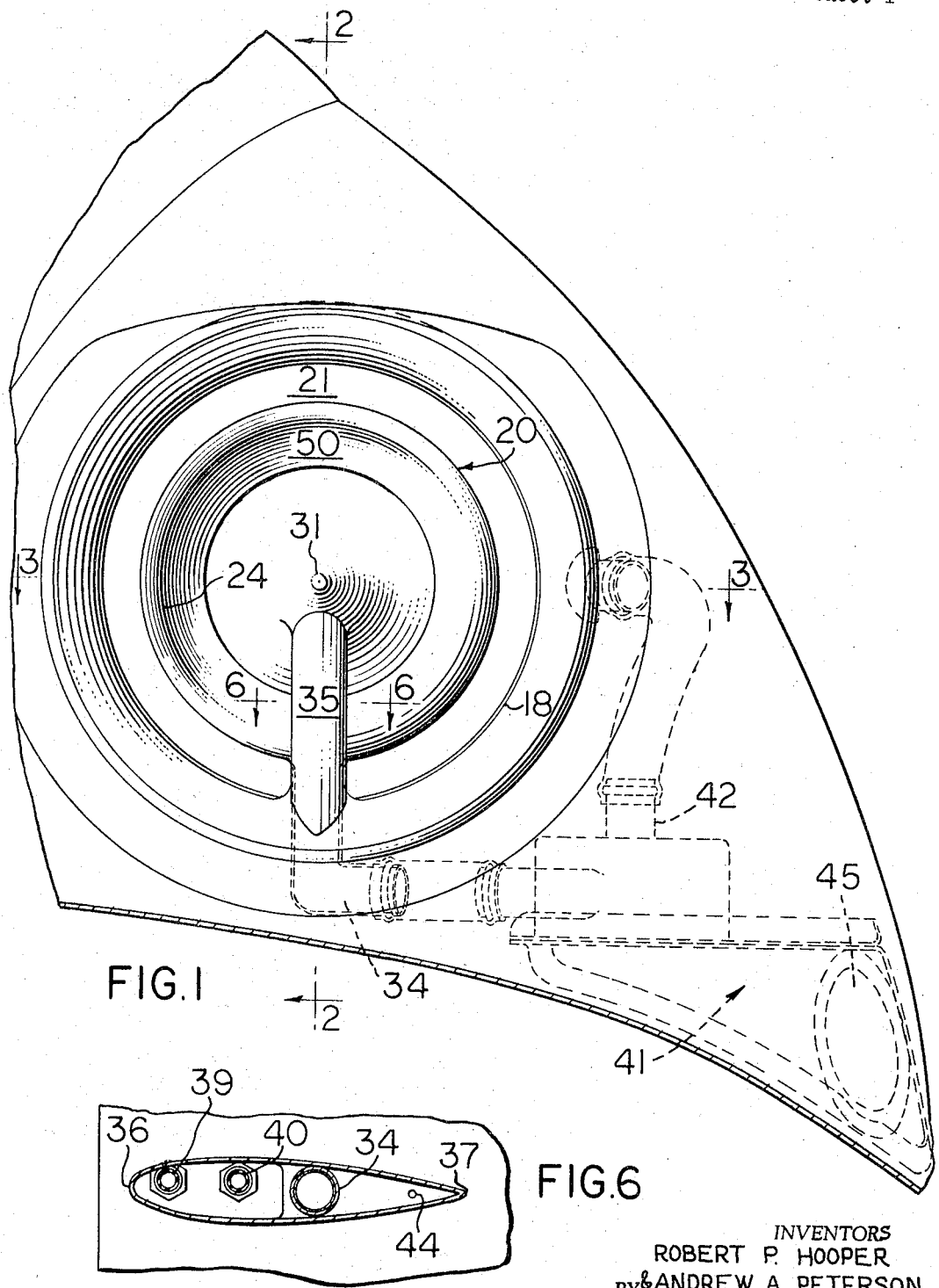

As shown in FIGURES 1 and 2, the particles are removed from the inner member or collection area 20 through a conduit 34, which is connected to the chamber 27 of the foreign particle collector. The conduit 34 passes through the air duct 21 and would tend to create turbulence of the air flowing through the duct. Accordingly, a streamlined member 35, which is preferably shaped like an airfoil, surrounds the conduit 34. The leading edge 36 of the streamlined member 35 is secured to the streamlined member 31 slightly forward of the point 32 and to the outer wall 17 adjacent its forwardmost point 19. The trailing edge 37 of the streamlined member 35 is connected to the rear end of the fairing member 22 and to the outer wall 17 adjacent its connection to the air intake passage 12.

As shown in FIGURES 2 and 3, the streamlined member 31 has an opening 38 in the portion formed by the radius of curvature to provide for passage of hydraulic and electric lines, such as lines 39 and 40, from exterior of the outer wall 17 of the inlet 16 to the starter 10'. The opening 30, which provides communication from the air duct 21 to the chamber 26, has the portion, which is enclosed within the streamlined member 35, closed.

As shown in FIGURE 1, the conduit 34 connects with a receptacle 41, which is mounted exteriorly of the inlet 16 on the fuselage of a helicopter, for example. The receptacle 41 has a second conduit 42 (see FIGURES 1 and 3) extending therefrom for connection with an annular manifold 43, which is secured to the outer wall 17 and surrounds it. The manifold 43 communicates with the interior of the air duct 21 of the inlet 16 through a plurality of peripherally spaced openings 44 in the outer wall 17. Thus, the air flowing through the air duct 21 creates a suction at the gap 29 through the means of the openings 44, the manifold 43, the conduit 42, the receptacle 41, and the conduit 34.

This suction tends to remove the particles from the chamber 26 through the gap 29, the chamber 27, and the conduit 34 to the receptacle 41. The particles may be removed when desired through a receptacle cover 45. Of course, the air, which is diverted through the opening 30 to the collection area, will return to the air flowing to the air intake passage 12 of the power plant 10 through the openings 44. Thus, a positive means of removing the foreign particles to the exterior of the inlet 16 is provided without a substantial increase in weight of the structure or pressure loss of the air flowing through the inlet 16. This reduces the pressure loss of the air to maintain the power loss of the power plant 10, due to the inlet 16, at a minimum.

The inlet 16 is preferably formed of a glass impregnated material although any suitable material may be used. In order to prevent any freezing of moisture particles in the inlet 16, it is desirable that the inlet 16 have substantially all of its structure heated. As shown in FIGURE 4, electric heating coils 46 are disposed between a glass cloth layer 47 on one side and two glass cloth layers 48 and 49 on the other side. Some portions of the inlet 16 are not heated and these merely have the three glass cloth layers 47, 48, and 49 secured together.

The inlet 16 has been tested in an arrangement with the air intake passage 12. A typical satisfactory set of parameters in these tests were found when a diameter of about 11 inches for the outer wall 14 of the main air passage 12 was assumed.

The tests indicated that the angular portion 50 of the fairing member 22 should be 1⅝ inches for best results. This is the distance B in the schematic of FIGURE 5. The distance from the point 24 to the point 19, which is indicated as A in the schematic of FIGURE 5, was found to be 4.27 inches for best results. Similarly, the radius of curvature, which is employed to form the portion of the streamlined member 31 between the points 32 and 33, should be 4¹¹⁄₁₆ inches in this arrangement. Furthermore, the constant radius, which is employed to form the outer wall between the points 18 and 19, is approximately 1⁷⁄₁₆ inches. The diameter of the outer wall 17 at the point 18, which is the minimum cross sectional area of the portion of the duct between the outer wall 17 and the streamlined member 31, is 11⅛ inches. In order that the larger particles may enter the opening 30, the tests showed that the opening 30 should be ½ inch. In order to provide even suction at the gap 29, the gap should only be .1 inch.

The radius of curvature of the member 31 was selected to provide the desired bounce of the particles from the air into the opening 30. If the entire length of the member 31 were formed as a cone, the amount of particles passing through the opening 30 would be substantially reduced.

Furthermore, it has been determined that the ratio of the diameter of the outer wall 17 of the inlet 16 at the point 18 to the distance from the minimum cross sectional area, as defined at the point 18, to the forwardmost point 24 of the fairing member 22 should be within a range of 3.3 to 4.2. In the test arrangement described, this ratio is approximately 3.76.

The constant radius, which is employed to define the outer wall between the points 18 and 19, must have a certain relationship to the diameter of the outer wall 17 at the point 18. This is because the constant radius determines the amount of particles that can impinge upon the streamlined member 31 and be deflected into the opening 30. The range of this ratio is between .12 and .13.

Tests indicated that 50 to 60% of the sand particles were removed from the foregoing test configuration. Over 70% of particles, which were substantially larger than the sand particles, were removed by the separator of the present invention. The angle of 30° of the angular portion 50 of the fairing member 22 resulted in about 30 to 40% of the water particles being separated at a relative humidity of approximately 18% without any consideration of evaporation; thus, if there is evaporation, the separation would be larger. With this structure, the tests disclosed that the foregoing separation occurred with a power loss no greater than .6%.

While the present invention has been described with respect to a structure employing walls with circular configuration, it should be understood that other configurations may be employed. For example, the various members could be of rectangular shape. While the present invention has been described with respect to the air intake passage of a gaseous power plant such as a gas turbine engine, it should be understood that the separator may be employed with any air moving member.

An advantage of this invention is that it removes a significant portion of the particles, especially of a size greater than ten microns, from the air flowing to the inner passage of a power plant while keeping the power loss of the power plant to less than 1%. Another advantage of this invention is that it removes the foreign particles from air flowing to the inlet of an air moving member without significantly affecting the flow path of the air. A further advantage of this invention is that the foreign particle separator maintains a positive suction pressure at the collection opening without any substantial increase in weight of the separator.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. An air inlet adapted to be connected to an air intake passage of an air moving member, the air intake passage having spaced inner and outer walls, said inlet having an outer wall with a periphery at least as great as the periphery of the outer wall of the air intake passage, said outer wall having an inlet lip configuration for focusing particles without disrupting the streamline flow of the entering air said inlet including an inner member surrounded by said outer wall and spaced therefrom to form an air duct therebetween for communication with the air intake passage, said inner member having a portion forming a continuation of the inner wall of the air intake passage, the cross sectional area of said air duct between said outer wall of said inlet and the portion of said inner member being at least equal to the cross sectional area of the air intake passage, said inner member having means forming a particle collector positioned inwardly of said air duct forming portion, said collector having an opening for collecting foreign particles focused to it by said inlet lip, said collector having means dividing said collector into a first chamber and a second chamber, said dividing means allowing communication between said chambers, said first chamber communicating with said collector opening, and means to remove the particles from said second chamber.

2. An air inlet adapted to be connected to an annular air intake passage of an air moving member, the air intake passage having spaced inner and outer walls, said inlet having an outer wall with a circumference at least as great as the maximum circumference of the outer wall of the air intake passage and an inlet lip configuration which focuses incoming foreign particles to a location within the air inlet, a fairing member forming a continuation of the inner wall of the air intake passage and cooperating with the outer wall of the inlet to form a first portion of an air duct, said fairing member increasing in circumference for a substantial distance in a direction opposite to the air flow through the air duct, said fairing member having its circumference decrease slightly from its maximum circumference at its forwardmost end, said fairing member having a portion extending rearwardly from its forwardmost end at an angle of substantially 30° to the centerline of the inlet to terminate with a circumference greater than its minimum, a member secured to the inner surface of said fairing member and cooperating therewith to form a foreign particle collector to which the particles focused by the inlet configuration are directed, said secured member including a partition portion to divide said collector into a first chamber and a second chamber, said partition portion being spaced from the angular portion of said fairing member to form a gap providing communication between said first chamber and said second chamber, a streamlined member attached to the innermost part of the secured member and extending forwardly therefrom, said streamlined member increasing in cross sectional area in the direction of air flow, said streamlined member cooperating with said outer wall of said inlet to form a second portion of said air duct, said first chamber having an opening for collecting particles from the air flowing through the second portion of the air duct, said second portion of said air duct having a greater cross sectional area than the cross sectional area of said first portion of said air duct, said outer wall of said inlet having a reduced circumference adjacent its forwardmost point for cooperation with said streamlined member to form a minimum cross sectional area of said second portion of said air duct, said outer wall of said inlet increasing in circumference from the point of the minimum cross sectional area of said second portion of said air duct to its forwardmost point along a constant radius, the ratio of the constant radius to the diameter of the outer wall of said inlet at the minimum cross sectional area of said second portion of said air duct being between .12 and .13, the ratio of the diameter of the outer wall of said inlet at the minimum cross sectional area of said second portion of said air duct to the distance between the forwardmost end of the fairing member and the minimum cross sectional area of the second portion of said air duct being between 3.3 and 4.2, and means to apply an even suction to the gap between said first chamber and said second chamber to remove the particles from said collector whereby a maximum amount of foreign particle separation from the incoming air is achieved with a minimum amount of pressure loss.

References Cited

UNITED STATES PATENTS

| | | | |
|---|---|---|---|
| 537,048 | 4/1895 | Lee | 55—442 |
| 676,119 | 6/1901 | Black | 55—463 |
| 2,158,863 | 5/1939 | Randall | 55—463 |
| 2,575,415 | 11/1951 | Grimac | 230—132 |
| 2,616,519 | 11/1952 | Crankshaw et al. | |
| 2,636,666 | 4/1953 | Lombard | 55—306 |
| 2,802,618 | 8/1957 | Prachar | 55—306 |
| 3,005,309 | 10/1961 | Rae | 230—133 |
| 3,148,043 | 9/1964 | Richardson et al. | 55—306 |

FRANK W. LUTTER, *Primary Examiner.*

HARRY B. THORNTON, *Examiner.*

B. NOZICK, *Assistant Examiner.*